Aug. 17, 1926.   1,596,546
H. E. MARTIN
APPARATUS FOR WRAPPING CARAMELS OR OTHER CAKES OR BLOCKS AND THE LIKE
Filed April 24, 1923   7 Sheets-Sheet 1

Fig. 1.

Aug. 17, 1926. 1,596,546
H. E. MARTIN
APPARATUS FOR WRAPPING CARAMELS OR OTHER CAKES OR BLOCKS AND THE LIKE
Filed April 24, 1923    7 Sheets-Sheet 3

H. E. MARTIN

1,596,546

APPARATUS FOR WRAPPING CARAMELS OR OTHER CAKES OR BLOCKS AND THE LIKE

Filed April 24, 1923     7 Sheets-Sheet 5

Patented Aug. 17, 1926.

1,596,546

UNITED STATES PATENT OFFICE.

HORACE ELTON MARTIN, OF GAINSBOROUGH, ENGLAND, ASSIGNOR TO BAKER PERKINS LIMITED, OF PETERBOROUGH, ENGLAND.

APPARATUS FOR WRAPPING CARAMELS OR OTHER CAKES OR BLOCKS AND THE LIKE.

Application filed April 24, 1923, Serial No. 634,358, and in Great Britain May 10, 1922.

This invention relates to apparatus for wrapping caramels or other cakes or blocks such as cubes of sugar and the like. The apparatus is generally speaking of the kind in which the caramel (or other article) is inserted with the wrapping paper (or other material) into a recess in an intermittently-moving member, during the further motions of which various folding operations are effected by the aid of stationary or moving folders, the final fold being effected automatically on the discharge of the caramel or other article into a delivery trough by means of a suitably-operated plunger. In such machines as heretofore known, however, the intermittently moving member is stationary at the moment when any particular folding operation is in progress, in contradistinction to the machine according to the present invention, in which there is no pause in the moving member from the moment when the article has been inserted into the recess until the moment when it is discharged into the delivery trough. The saving of time thus secured is a principal object of the invention, other objects being greater efficiency and accuracy in the wrapping operations, compactness, and simplicity and consequent cheapness of construction.

According to the present invention, the moving member in which the recess is provided consists of an oscillating arm actuated at the proper times by a cam or like mechanism from the main driving shaft of the apparatus. The arm is preferably actuated positively in both directions of motion by providing twin cams on the main driving shaft (thus avoiding any uncertainty of action due to the use of springs) and the arm is also preferably pivoted in bearings at or towards the rear of the apparatus and is so located and arranged as will be described later as to render it an easy operation to withdraw it for, say, cleaning purposes, by merely removing the pivot pin. The wrapping of the caramel or other article is effected on the downward movement of the arm by stationary and moving folders, or by stationary folders alone in one form of the apparatus, the caramel or other article in its wrapping being expelled by a plunger from the recess in the arm when in its extreme downward position, slightly lower than where the caramel or other article was fed into the apparatus. One great advantage of the present invention is that the caramel and the subsequent wrapping operations thereon are continually under the eye of the operator, who need not stir from his or her position during the whole cycle of operations. This greatly facilitates proper control of the apparatus.

For commencing the folding of the ends of the package, we provide special folders to co-operate with the moving member, these folders being held stationary momentarily while the member moves towards them, this effecting the folding-in of a corner of the projecting ends of the wrapping material. After this momentary stationary period, the folders are moved by any suitable means so as to pass across the end faces of the package and smooth down the wrapping material against them. These folders can be applied to other machines of the general type described above.

The stationary folder member into which the caramel (or other article) is discharged from the moving arm, and in which the projecting side folds are turned down on to the top of the package, can also be applied to other machines of the general type described. According to the invention it is provided with grooves, slots or the like in a known manner, but the said grooves, slots or the like converge at different angles so that one fold may be turned down completely and the other then turned down on top of it, should the depths of the folds cause them to overlap. This will be described in greater detail later.

According to the invention I further propose to provide the said apparatus with (inter alia) improved means for controlling the supply of wrapping material from which the wrappers for the caramels and so forth are cut. These means comprise a preferably channelled member through which the wrapping material passes and which can be adjusted laterally against resilient pressure by an adjusting screw or by equivalent means. Further the length of wrapping material fed to the cutters is varied as required by passing it over a roller which is rotated intermittently by a pawl and ratchet mechanism, the distance the pawl moves through at each stroke being varied by eccentric mechanism operated from the main driving shaft. The wrapping material is kept taut by resilient means.

I also provide improved mechanism for controlling the feeding of the wrapping material. Such mechanism comprises a driven roller against which a second roller mounted on a pivoted arm or arms is pressed by means preferably of springs (the wrapping material passing between the rollers) and a spring trigger arrangement which can be caused at will to engage the end of the pivoted arm or arms and hold the second roller away from the first. This is useful for instance, if the machine requires overhauling and the supply of wrapping material has consequently to be stopped or when the machine has to be left out of action for some time, when it obviates the formation of flats on the second roller.

Further improvements according to the invention include means for adjusting the extent to which the hinged cover to the recess in the oscillating arm can be opened and the provision of resilient compression roll brackets on the sides and top of the delivery channel into which the caramel or the like is discharged from the main operating arm said resilient brackets being for the purpose of ensuring proper contact with the caramel or the like and accurate and efficient completion of the wrapping process.

I will first describe my invention with reference to Figs. 1 to 11 of the accompanying drawings which show the apparatus as particularly adapted for wrapping caramels and in which:—

In what follows it will be assumed that the article to be wrapped is a caramel and that the wrapping material is paper.

Figure 1:
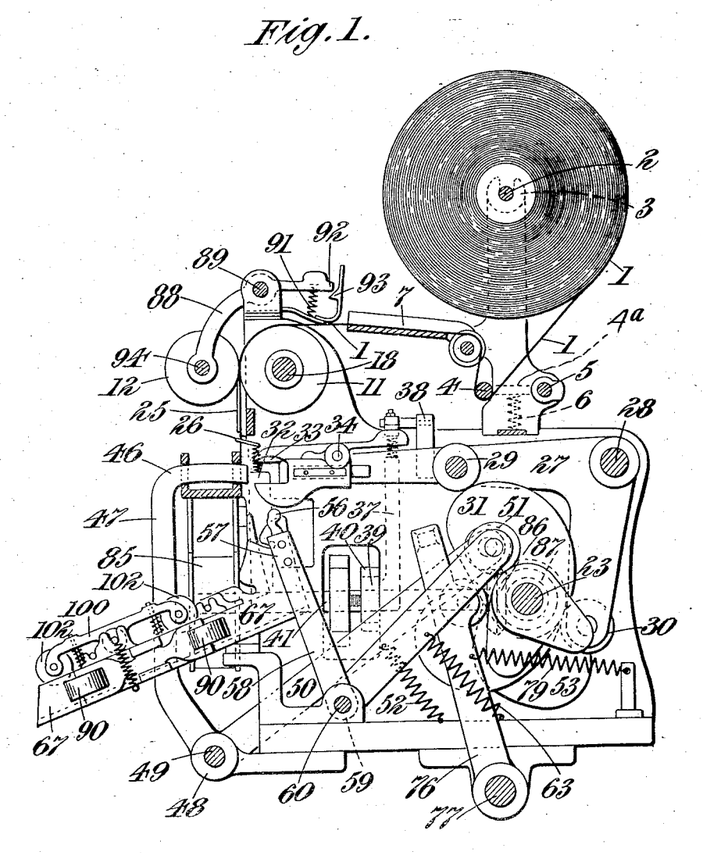
Fig. 1 is a sectional elevation of the apparatus generally.
Figure 3:
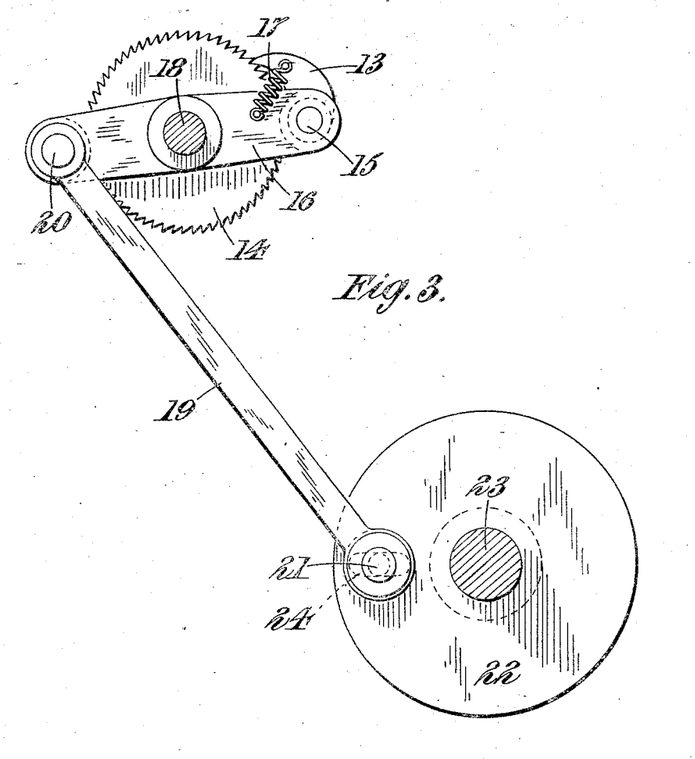
Fig. 3 is a side elevation of the operating mechanism for feeding the paper, or other wrapping material.
Figure 4:
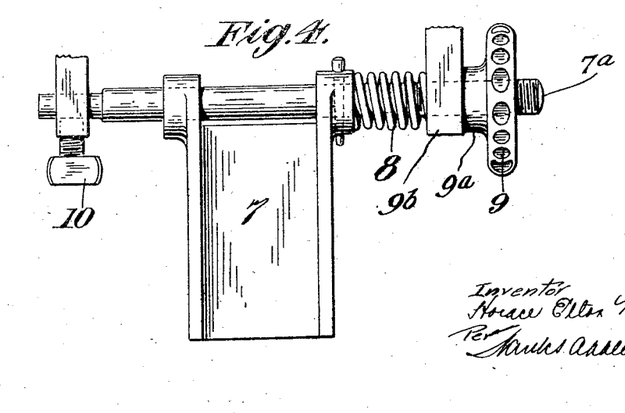
Fig. 4 is a plan of the adjustable paper guide showing more clearly the means for adjusting the guide to any desired position.

Referring to Fig. 1 of the drawings, the paper 1 in which the caramel is to be wrapped is contained in a roll supported upon a carrier 2 capable of rotating in bearings 3 and is led from the said roll beneath a rod 4 provided with arms $4^a$ which are hinged at 5 to the apparatus, the rod being drawn downwards constantly by the action of a spring 6 thus keeping the paper 1 taut. The paper is brought up and passed through a channel guide 7 (see Fig. 4 of the drawings). The guide 7 is pinned to a spindle $7^a$ which is threaded at one end and carries a milled wheel 9 by rotation of which the spindle is adjusted in one direction of motion, being returned when the wheel 9 is released by means of the spring 8. In a preferred form of adjusting means, however, the boss $9^a$ of the wheel 9 passes through the framing $9^b$ of the apparatus and is furnished with a collar on the further side. In this case the spring 8 can be dispensed with, since rotation of the wheel 9 in either direction actuates the spindle $7^a$ positively. After leaving the guide 7 the paper 1 is then passed between rollers 11 and 12 (see Fig. 1 of the drawings). The roller 11, is secured to the shaft 18, intermittently rotated by a pawl 13 (see Fig. 3 of the drawings) which engages in a toothed wheel 14 which is secured to the said shaft. The pawl 13 is pivoted at 15 to the arm 16 and acts under the influence of a spring 17. The arm 16 is pivoted on the shaft 18 and is operated through a rod 19, pivotally mounted at one end at 20 to the arm 16 and at the other end at 21 eccentrically on a disc 22, which is secured to the main driving shaft 23. The said disc 22 has a slot 24 formed therein, whereby the pivot 21 may be moved so that the throw of the rod 19 may be adjusted as desired (thereby providing means by which the intermittently-rotating movement of the paper feeding roller 11 may be altered to give any required length of paper in which to wrap the caramel). The roller 12 is constantly pressed to the driven roller 11 (see Fig. 1 of the drawings). The said roller 12 is pivoted at 94 to the arm 88 which in its turn is hinged at 89 and is acted upon by a spring 91. When the pressure of the roller 12 is not required it can be held off the driven roller 11 by forcing the tail 92 of the arm 88 downwards, whereby a spring clip 93 mounted on the frame of the apparatus will engage on the tail 92 and hold it depressed. This is useful when the machine has to be out of action for some time, as during cleaning operations or the like. The paper 1 is then fed between cutters 25 and 26 (see Fig. 1 of the drawings) the length of paper fed through the cutters at each operation of the pawl 13 being sufficient to constitute one wrapper. The paper is kept constantly fed forward to supply the cutters 25 and 26 by means of the rollers 11 and 12, the roller 11 being driven positively and the roller 12 by frictional contact as described above.

Figure 2:
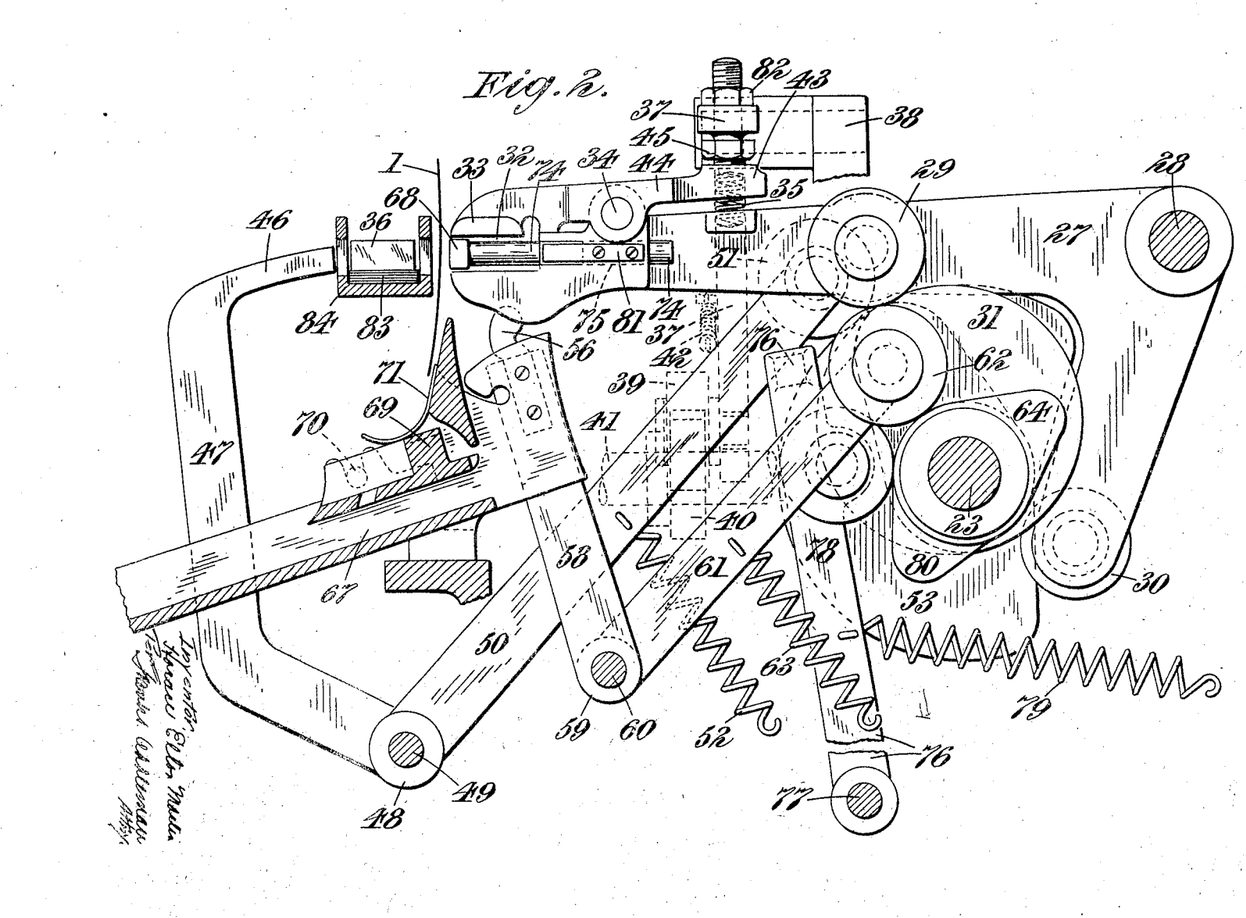
Fig. 2 is a side elevation of the main operating and oscillating arm showing more clearly the recess in which the caramel is received, and its hinged cover, and operating mechanism, and the folders in connection therewith in accordance with this invention.

The main operating arm 27 is pivotally mounted at or towards the rear of the apparatus between suitable supports or brackets on a shaft or pin 28 with its forward end in close proximity to the paper 1 as more clearly shown in Fig. 2 of the drawings. It is formed as a bell-crank lever actuated through the antifriction rollers 29 and 30 situated in different planes by twin cams 31 secured to the main driving shaft 23, the twin cams actuating the arm positively in both directions of motion, and thus avoiding any uncertainty of movement which might arise from the use of a spring to effect the return motion. By simply withdrawing the pin 28 the arm can be removed immediately from the machine, since it is not connected positively with any other element, and thus any cleaning or replacement which may be necessary can be effected with great ease. The arm 27 has a recess 32 formed therein, this recess having a cover 33 hinged at 34 on the arm 27 itself and adapted to be opened against the action of a spring 35 to facilitate the introduction of the caramel 36 and paper 1. The opening of the cover 33 is effected by a lever 37, which is pivoted at 38 to the apparatus and is actuated against a spring 42 through an antifriction roller 39 on one end of the lever which contacts with a cam 40 secured to the rotating shaft 41 of the apparatus which is driven from the shaft 23 through bevel gearing 86—87 (Fig. 1). The formation of the said cam 40 permits the adjusting screw 45 which is threaded into one end of the lever 37 to engage at the proper time with a projection 43 formed on the tail 44 of the cover 33 so that it is turned on its hinge and opened. The screw 45 constitutes the means by which the cover 33 can be opened to any desired extent and the nut 82 the means by which the screw 45 can be locked in position.

Figure 5:
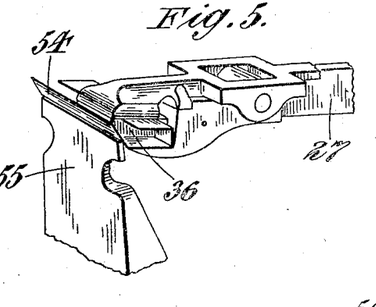
Figs. 5 and 6 show in perspective, and Figs. 7 and 8 in side elevation, different stages in the folding operations.
Figure 6:
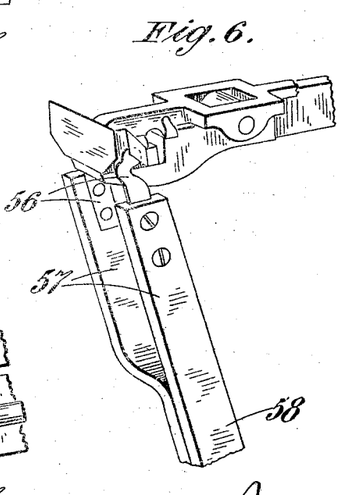
Figure 7:
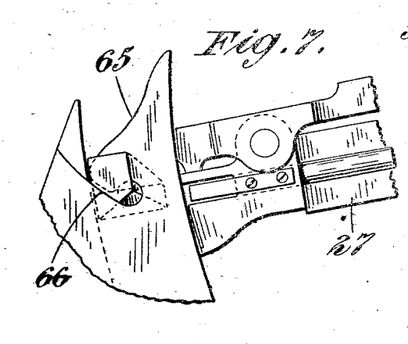

The caramel 36 and the cut-off piece of paper 1, are forced into the recess 32 by a plunger 46 moving across a band 83 which carries the said caramel along a trough 84. The band 83 is operated through a band wheel 85 (see Fig. 1 of the drawings) which is secured to the rotating shaft 41 the latter being driven from the main shaft 23 as before described by means of bevel gears 86 and 87. The plunger 46 (see Fig. 2 of the drawings) is part of an arm 47 which is formed integral with a sleeve 48 (pivotally mounted at 49) and with another arm 50 the latter being actuated through an antifriction roller 51 against a spring 52 by a cam 53 secured to the main driving shaft 23. The caramel 36 and paper 1 having now been pressed into the recess 32 the cover 33 of the said recess is closed by the action of the spring 35. Sufficient paper now projects from the end of the main operating arm 27 for completing the folding of the paper around the caramel 36 and from each side of the latter sufficient paper projects for completing the end folds as shown in Fig. 5 of the drawings, the said projecting parts being folded in the following manner. The part 54 of the paper projecting from the end of the main operating arm 27 is folded against the adjacent side of the caramel 36 by the guide 55, which is shaped to conform to the path of the main operating arm 27 and which upon the partial downward movement of the said arm acts as a stationary folder. The paper being partly folded round the caramel 36 the main operating arm 27 moves further downwards when the projecting ends of the paper are acted upon by two blades 56 which are caused to make the first folds as shown in Fig. 6 of the drawings. Each of the blades 56 is secured to the forked head 57 of an arm 58 formed integral with a sleeve 59 pivotally mounted at 60 (see Fig. 2 and 6 of the drawings). The said sleeve 59 has another arm 61 formed integral therewith, which is actuated through an antifriction roller 62 against a spring 63, by a cam 64 secured to the main driving shaft 23. As the arm 27 moves downward, the folders 56 are for an instant stationary, so that they meet and tuck in the rear corners of the paper (Fig. 6) in making the fold. Then the cam 64 comes into action and the folders swing back moving across and smoothing the paper against the ends of the caramel as shown in Fig. 6. The whole action is so rapid that the stationary period of the folders is hardly noticed. The thus partially-folded ends of the wrapper as the main operating arm 27 still moves further downwards, pass between stationary folders 65 and 66 on each side of the said wrapper and these make the next folds as shown in Fig. 7, the fold on the righthand side of the end of the caramel being made first by the folder 65 and then that on the left hand side by the folder 66. The folder 65 preferably has the peaked form shown in Fig. 7 as it is found that this is the best form for controlling the folding over of the loose paper of the ends from start to finish.

At this stage the caramel is covered with paper on its underside, its two narrow sides and partially on the topside, there being upstanding portions of paper still to be folded, namely, that on the left side and the two end folds, to complete the wrapping.

The arm 27 continues its downward movement and at its lowest position, the caramel thus partially wrapped is brought opposite to and is pushed into a delivery trough 67 (see Fig. 8) by a plunger 68 working in the recess 32 of the arm (seen more clearly in Fig. 2). As the caramel is ejected from the recess 32 and enters the trough 67, the upstanding portion of paper at the left side is turned down on to the top of the caramel by the leading edge of a lid 69, leaving the end folds still upstanding as in Fig. 8 of the drawings.

Figure 8:
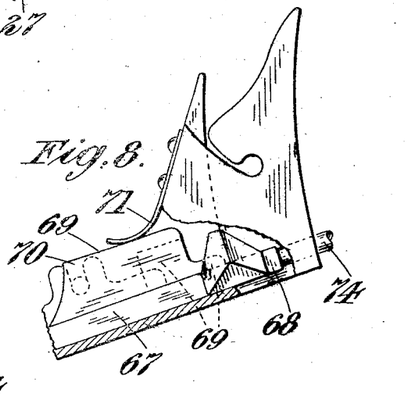

The lid 69 is in effect a stationary folder but slots 70 are provided with which the lid engages to allow the latter to rise against the pressure of a spring 71 and thus ease its action.

Figure 9:
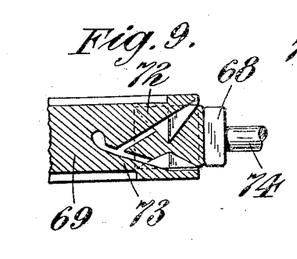
Fig. 9 shows in sectional plan, the means for forming the final folds successively.
Figure 10:
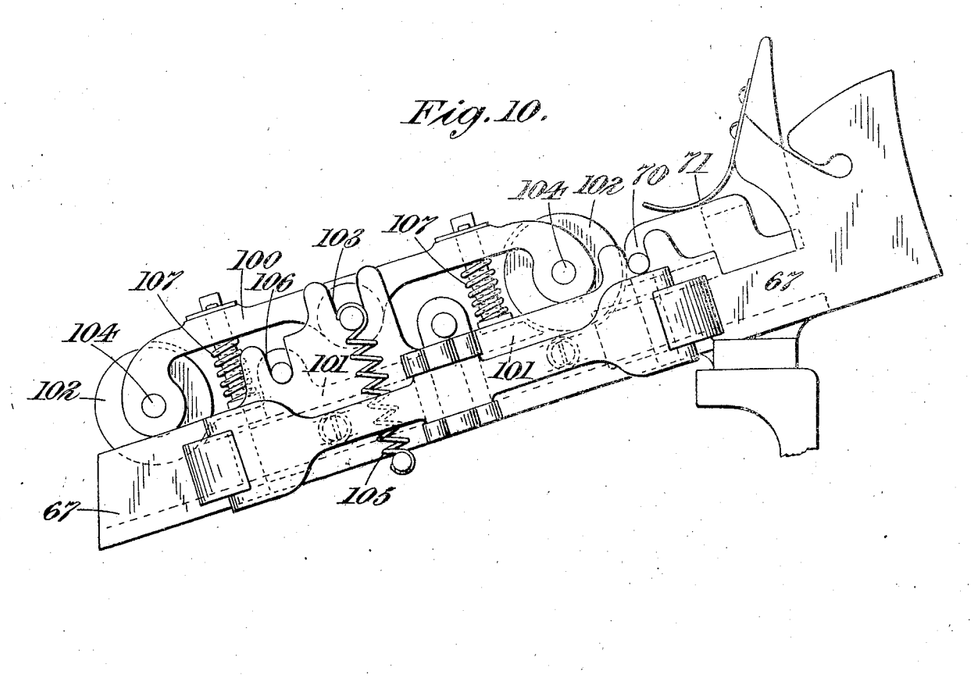
Figs. 10 and 11 illustrate in side elevation and plan respectively the delivery trough, showing more clearly the resilient compression roll brackets, and mechanism thereon, whereby the caramel or other article, in its wrapping paper, or like material, is assured of proper contact therewith for complete folding, when it has been ejected from the recess in the main operating arm.
Figure 11:
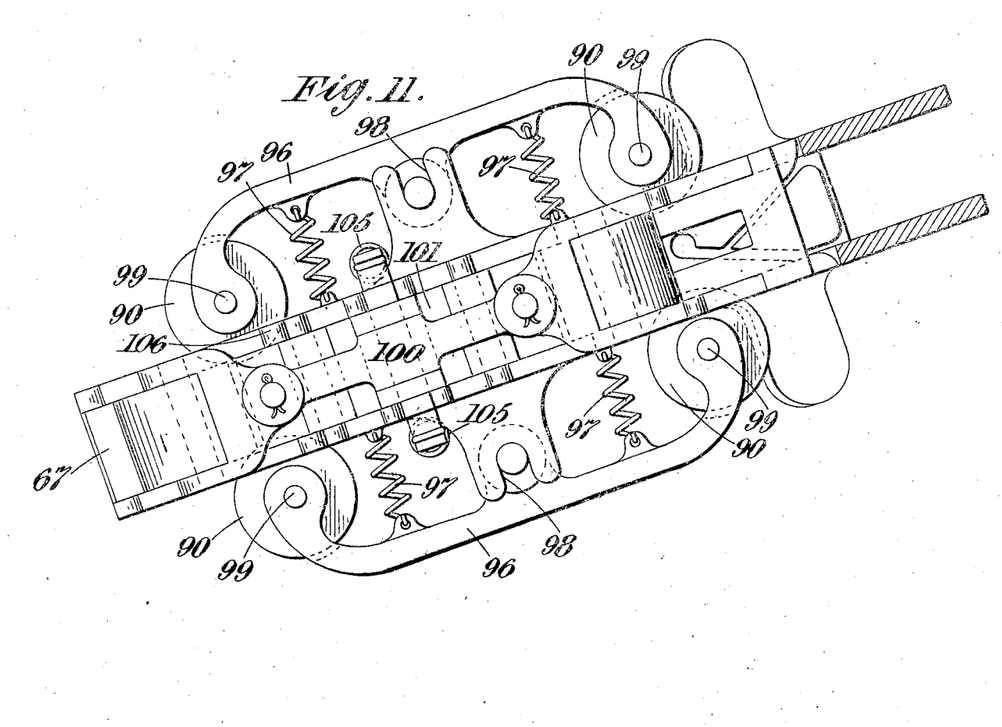
Figure 12:
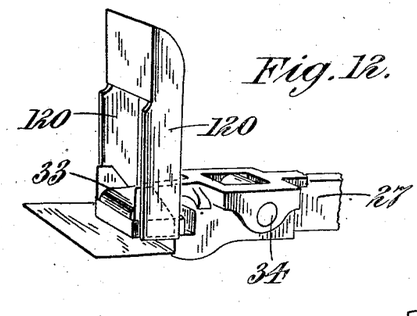
Figs. 12 and 13 are perspective views of fragments of an operating arm with parts associated with it.

As the caramel travels down the trough 67 the upstanding end folds are folded down one in advance of and therefore under the other, on to the top of the caramel, the folding being done by two converging folder elements 72 and 73, (shown in plan by Fig. 9) which are formed in the lid 69, the said folder being arranged to converge eccentrically so as to complete the final folds successively. In the usual form of folder, in which the elements 72, 73 converge to the centre of the lid 69, if the projecting side folds which are to be turned down on the top of the caramel are longer than half the width of the caramel, the points of the folds meet at the centre of the lid and the folds cannot be completed properly. By means of the present invention, one fold is turned down faster than the other and they are thus folded accurately one on top of the other. These folder elements 72 and 73 act as stationary folders as the caramel is forced along the delivery trough 67 by the ejector plunger 68 see Fig. 9. The ejector 68 (see Fig. 2 of the drawings) working in the recess 32 is provided with a stem 74 slidable in a bearing 75 on the main operating arm 27 and is forced outwardly to eject the partially wrapped caramel as the said caramel is brought into the ejecting position, by an arm 76 (see Fig. 2 of the drawings). The arm 76 is pivoted at 77 on the frame of the apparatus and is adapted to be operated through an antifriction roller 78 against a spring 79 by a cam 80 secured to the main driving shaft 23 so that the upper end of the said arm 76 acts on the inner end of the stem 74 to force it outwardly and eject the partially wrapped caramel as aforesaid. A blade spring 81 secured to the main operating arm bears upon the stem 74 with sufficient pressure to hold the ejector 68 in the new position to which it is moved. The delivery trough 67 is provided with spring compression roll brackets fitted with rollers (see Figs. 10 and 11 of the accompanying drawings) so as to ensure proper contact with the caramel in its wrapping paper when it has been ejected from the recess 32 in the main operating arm 27. The roll brackets 96 of the trough 67 are capable of moving outwards in the slots 98 against the action of the springs 97 and are fitted with rollers 90 which are capable of revolving on the pivots 99. The delivery trough 67 has three compression roll brackets 69, 100 and 101 respectively. The bracket 100 is capable of moving upwards in the slots 103 against the action of the springs 105 and is fitted with rollers 102 which are capable of revolving on the pivots 104. The bracket 101 is capable of moving upwards in the slots 106 against the action of the springs 107. The bracket 69 is capable of moving upwards in slots 70 against the action of a spring 71 as aforesaid.

It will be appreciated that with very little alteration to the machine it will wrap caramels or other articles in a different style. Figs. 12–16 show alterations in the machine as adapted for wrapping cubes of sugar, and correspond with Figs. 5–9 as showing different stages in the wrapping process. The cubes of sugar are wrapped two at a time and side by side, and for this purpose the cover 33 is duplicated, each separate cover resting on one of the cubes, this making provision for slight inequalities of dimensions between the two cubes.

Figure 13:
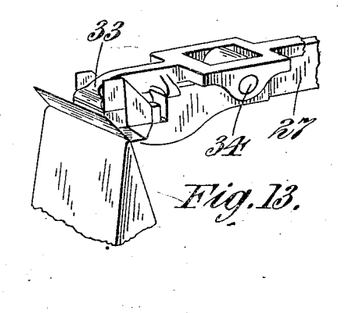
Figure 14:
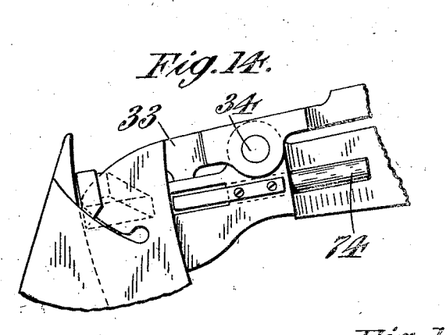
Fig. 14 is a view in side elevation of the said arm and parts associated with it.
Figure 15:
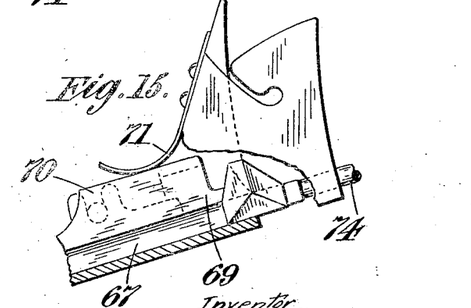
Fig. 15 is a view in side elevation of a fragment of a delivery trough and folders for one step of the operation associated therewith.
Figure 16:
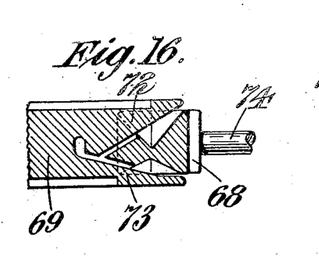
Fig. 16 is a sectional view of a lid acting as a stationary folder.

The reciprocating folders 56 (see Figs. 6 and 2 of the drawings) are removed as they are not required and two stationary folders 120 (see Fig. 12) are attached to the machine in close proximity to the recess 32 when it is in the receiving position. As the cubes of sugar enter the recess 32 together the paper is folded down on top of them by the covers 33 and at the same time the stationary folders 120 turn in the paper from the rear edge of the end face of the package to be made, the paper assuming the peaked form shown in Fig. 12. In Fig. 13 is shown the next stage, the projecting portion 54 of the paper being turned up by the stationary folder 55. The side folds are completed in Fig. 14 in a manner similar to Fig. 7 though the peaked formation of the folder 65 is not necessary in this case. The completion of the wrapping is shown in Figs. 15 and 16 which are similar to Figs. 8 and 9.

I claim:—

1. In an apparatus for wrapping caramels, cakes or blocks and the like, suitably supported folders, an intermittently moving member coacting therewith for imparting initial folding movement to a wrapper at the ends of the article to be wrapped, means for holding the folders momentarily stationary during part of the movement of the intermittently moving member towards them, and means for imparting movement to the folders across the end faces of the article to be wrapped, substantially as described.

2. In an apparatus for wrapping caramels, cakes or blocks and the like, an oscillatably mounted arm, means for feeding an article to be wrapped and the wrapping material to the oscillatably mounted arm, means for laterally adjusting the position of the wrapping material as it is fed, folders coacting with the said arm for wrapping the material around the article to be wrapped and from which the said article with wrapper attached is ejected, substantially as described.

3. In an apparatus for wrapping caramels, cakes or blocks and the like, an oscillatably mounted arm, a main driving shaft, twin cams mounted upon the main driving shaft and operative to actuate the oscillating arm in both directions, means for feeding an article to be wrapped and the wrapping material to the oscillatably mounted arm, means for laterally adjusting the position of the wrapping material as it is fed, folders coacting with the said arm for wrapping the material around the article to be wrapped and from which the said article with wrapper attached is ejected, substantially as described.

4. In an apparatus for wrapping caramels, cakes or blocks and the like, an arm supporting member, bearing rearwardly located, a pivot pin removable in the bearings, an arm oscillatably mounted on the pin, the said arm being capable of removal from the apparatus when the pin is disassociated from its bearings, means for feeding an article to be wrapped and wrapping material to the oscillatably mounted arm, means for laterally adjusting the position of the wrapping material as it is fed, folders coacting with the said arm for wrapping the material around the article to be wrapped and from which the said article with wrapper attached is ejected, substantially as described.

5. In an apparatus for wrapping caramels, cakes or blocks and the like, an oscillatably mounted arm, means for feeding an article to be wrapped and the wrapping material to the oscillatably mounted arm, means for producing an intermittent supply of wrapping material and cutters operative on the wrapping material for controlling the length of material delivered, folders coacting with the said arm for wrapping the material around the article to be wrapped and from which the said article with wrapper attached is ejected, substantially as described.

6. In an apparatus for wrapping caramels, cakes or blocks and the like, an oscillatably mounted arm, means for feeding an article to be wrapped and the wrapping material to the oscillatably mounted arm, a delivery trough having spring sides and lids for insuring proper contact with the wrapped article, folders coacting with the said arm for wrapping the material around the article to be wrapped and from which the said article with wrapper attached is ejected, substantially as described.

HORACE ELTON MARTIN.